United States Patent [19]
Fry et al.

[11] Patent Number: 5,331,476
[45] Date of Patent: Jul. 19, 1994

[54] APPARATUS AND METHOD FOR DYNAMICALLY PERFORMING KNOWLEDGE-BASED ERROR RECOVERY

[75] Inventors: Scott M. Fry; Pamela R. Nylander-Hill, both of Tucson, Ariz.; Michael M. Lee, Foster City, Calif.; Sushama M. Paranjape, Tucson, Ariz.

[73] Assignee: International Business Machines Corporation, Armonk, N.Y.

[21] Appl. No.: 99,801

[22] Filed: Jul. 30, 1993

[51] Int. Cl.$^5$ .................. G11B 27/36; G11B 5/09
[52] U.S. Cl. .............................. 360/53; 360/31
[58] Field of Search ................ 360/31, 53, 74.4; 371/21.6, 41

[56] References Cited

U.S. PATENT DOCUMENTS

| | | | |
|---|---|---|---|
| 4,870,645 | 9/1989 | Herron | 360/53 |
| 4,908,826 | 3/1990 | Hertrich | 360/53 |
| 5,050,018 | 9/1991 | Georgis et al. | 360/53 |
| 5,251,077 | 10/1993 | Saitoh | 360/53 |
| 5,262,905 | 11/1993 | Takagi et al. | 360/53 |

Primary Examiner—Donald Hajec
Assistant Examiner—Won Tae C. Kim
Attorney, Agent, or Firm—Baker, Maxham, Jester & Meador

[57] ABSTRACT

A tape drive data storage apparatus incorporates an error recovery system that is dynamically controlled to perform knowledge-based error recovery in accordance with a novel error recovery method. As the tape drive apparatus performs read and/or write data transfer operations on a tape medium loaded in the tape drive, an error recovery knowledge base is generated representing a tape map of ECC error correction locations on the tape medium. If error recovery is initiated and it is determined from the tape map that one or more error clustering thresholds have been reached in one or more selected regions of the tape medium, appropriate error recovery action is taken depending on whether a data read or data write operation is underway. If read (or write) data is being processed, the error recovery procedures performed by the error recovery system can be selectively modified in the affected tape medium regions to address the expected cause(s) of the data error. If write data is being processed, the affected tape regions can be demarked so that data is not written thereon during subsequent write operations. In this way, error recovery and data transfer operations can be tailored based on knowledge that localized media defects have been found.

20 Claims, 9 Drawing Sheets

APPARATUS AND METHOD FOR DYNAMICALLY PERFORMING KNOWLEDGE-BASED ERROR RECOVERY

BACKGROUND OF THE INVENTION

The present invention is directed generally to the recording and retrieval of digital information on magnetic tape, and more particularly to methods and procedures for minimizing errors occurring during data transfer operations.

Conventional tape drive data storage apparatus employ various error correction and recovery methods to detect and correct data errors which, if left unresolved, would compromise the integrity of information read from or written to the magnetic tape media. Events which can lead to data errors include defects on the media, debris between the tape head and the media, and other conditions that interfere with head/media data transfer operations.

Error correction and recovery may be thought of as two distinct operations that are employed at different stages of error processing. Error correction is conventionally implemented using error correction coding (ECC) techniques in which random host data to be placed on a tape medium is encoded in a well-defined structure by introducing data-dependent redundancy information. The presence of data errors is detected when the encoded structure is disturbed. The errors are corrected by making minimal alternations to reestablish the structure. ECC error correction is usually implemented "on-the-fly" as data is processed by the tape drive apparatus. The well-known Reed-Solomon code is one cyclic encoding scheme which has been proposed for ECC error correction. Other encoding schemes are also known in the art.

Error recovery occurs when ECC error correction is unable to correct data errors or when thresholds for allowable error correction are exceeded. The error recovery process usually requires stopping the tape and reprocessing a data block in which an error was detected. Typical error recovery procedures include tape refresh operations wherein a tape is wound to its end and brought back to the error recovery point, tape backhitch or "shoeshine" operations wherein a tape is drawn back and forth across the tape head, backward tape read operations, tape tension adjustment operations and tape servo adjustment operations, to name a few.

In prior art error recovery systems, it is common to perform a preprogrammed sequence of error recovery procedures in response to data errors that result in error recovery. In many cases, however, one or more error recovery procedures may not be required. For example, errors caused by localized tape defects or track fading due to debris adhering to either the tape media or the read/write heads can affect tracks for long stretches of tape as debris is dragged along. Errors of this type can often be resolved by reversing tape motion and dislodging the debris. In that case, other error recovery procedures may be unnecessary.

Prior art error recovery systems also lack the ability to avoid repetition of error recovery procedures in areas of the tape media where error activity is likely to reoccur. Error recovery is performed each time an error results in the affected area. This leads to data processing inefficiencies which could be potentially minimized if information about error prone media areas was known in advance.

Accordingly, there is a need in the art for a system and method for recording and retrieving digital information on a tape wherein data error conditions are anticipated and resolved in an efficient manner. Rather than perform a preprogrammed sequence of error recovery procedures, it would be desirable to tailor error recovery to the immediate cause of the data error. Moreover, it would be further advantageous if data errors could be predicted so that appropriate action could be taken to minimize the occurrence and/or effects of such errors.

SUMMARY OF THE INVENTION

In accordance with the foregoing objectives, a tape drive data storage apparatus incorporating the inventive concepts herein includes a control system for reading and writing host data on a streaming tape medium, an error correction coding (ECC) system for detecting and correcting data transfer errors, and an error recovery system for performing non-ECC correctable error recovery. The error recovery system is dynamically controlled to perform knowledge-based error recovery in accordance with a novel error recovery method. As the tape drive apparatus performs read and/or write data transfer operations on a tape medium loaded in the tape drive, an error recovery knowledge base is generated representing a tape map of ECC error correction locations on the tape medium. If error recovery is initiated and it is determined from the tape map that one or more error clustering thresholds have been reached in one or more selected regions of the tape medium, appropriate error recovery action is taken depending on whether a data read or data write operation is underway. If read (or write) data is being processed, the error recovery procedures performed by the error recovery system can be selectively modified in the affected tape medium regions to address the expected cause(s) of the data error. If write data is being processed, the affected tape regions can be demarked so that data is not written thereon during subsequent write operations. In this way, error recovery and data transfer operations can be tailored based on knowledge that localized media defects have been found.

BRIEF DESCRIPTION OF THE DRAWINGS

The objects, advantages and features of the present invention will be more clearly understood by reference to the following detailed disclosure and the accompanying drawing in which:

FIG. 7b is a second portion of the flow diagram of FIG. 7a; and

FIG. 7c is a third portion of the flow diagram of FIG. 7a.

DETAILED DESCRIPTION OF THE PREFERRED EMBODIMENTS

Figure 1:
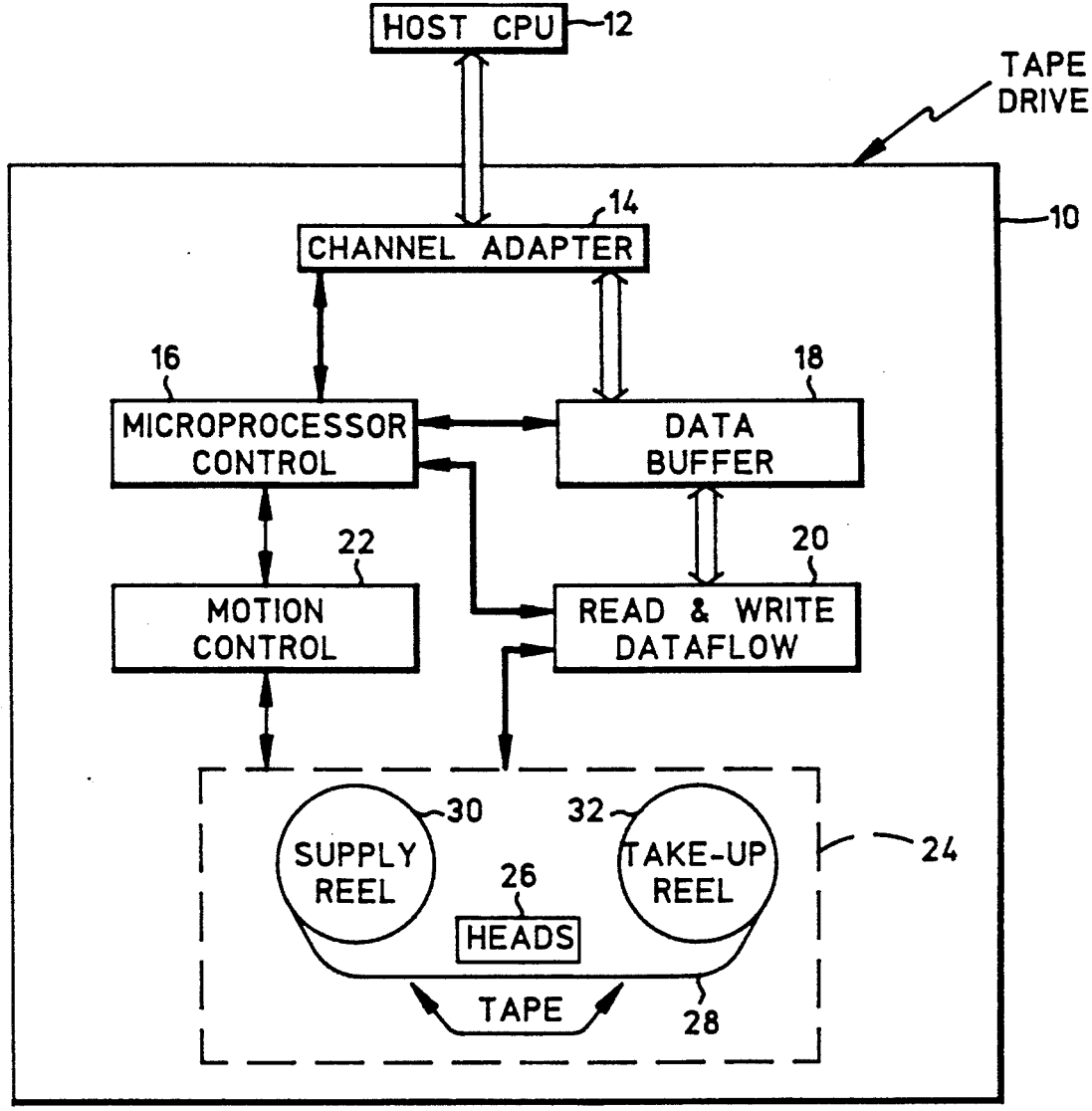
FIG. 1 is a block diagram showing a tape drive data storage device adapted for use with the present invention.

Referring now to FIG. 1, the inventive concepts herein described may be embodied in a tape drive data storage device 10 for storing (and retrieving) data provided by a host digital processing device 12, which could be a general purpose computer or other processing apparatus outputting data to be stored on a streaming magnetic tape medium. The tape drive 10 includes plural components providing a control system for reading and writing host data on the medium. Those components include a channel adaptor 14, a microprocessor controller 16, a data buffer 18, a read/write dataflow circuit 20, a motion control system 22 and a tape interface system 24.

The microprocessor controller 16 provides overhead control functionality for the operations of all other components of the tape drive 10. The functions performed by the microprocessor controller 16 are programmable via microcode routines, as is known in the art. During data write operations (with all dataflow being reversed for data read operations), the microprocessor controller activates the channel adaptor 14 to perform the required host interface protocol for receiving an information data block. The channel adaptor 14 communicates the data block to a data buffer 18 that stores the data for subsequent read/write processing. The data buffer 18 in turn communicates the channel adaptor 14 to the read/write dataflow circuitry 20, which formats the device data into physically formatted data that may be recorded on a magnetic tape medium. The read/write dataflow circuitry 20 is also responsible for executing all read/write data transfer operations under the control of the microprocessor controller 16. Formatted physical data from the read/write circuitry 20 is communicated to a tape interface system 24 including one or more read/write heads 26 and appropriate drive components (not shown) for performing forward and reverse movement of a tape medium 28 mounted on a supply reel 30 and a take-up reel 32. The drive components are controlled by the motion control system 22 to execute such tape movements as forward and reverse recording and playback, rewind and other tape motion functions. In addition, in multi-track tape drive systems, the motion control system 22 transversely positions the read/write heads relative to the direction of longitudinal tape movement in order to record data in a plurality of tracks.

Figure 2:
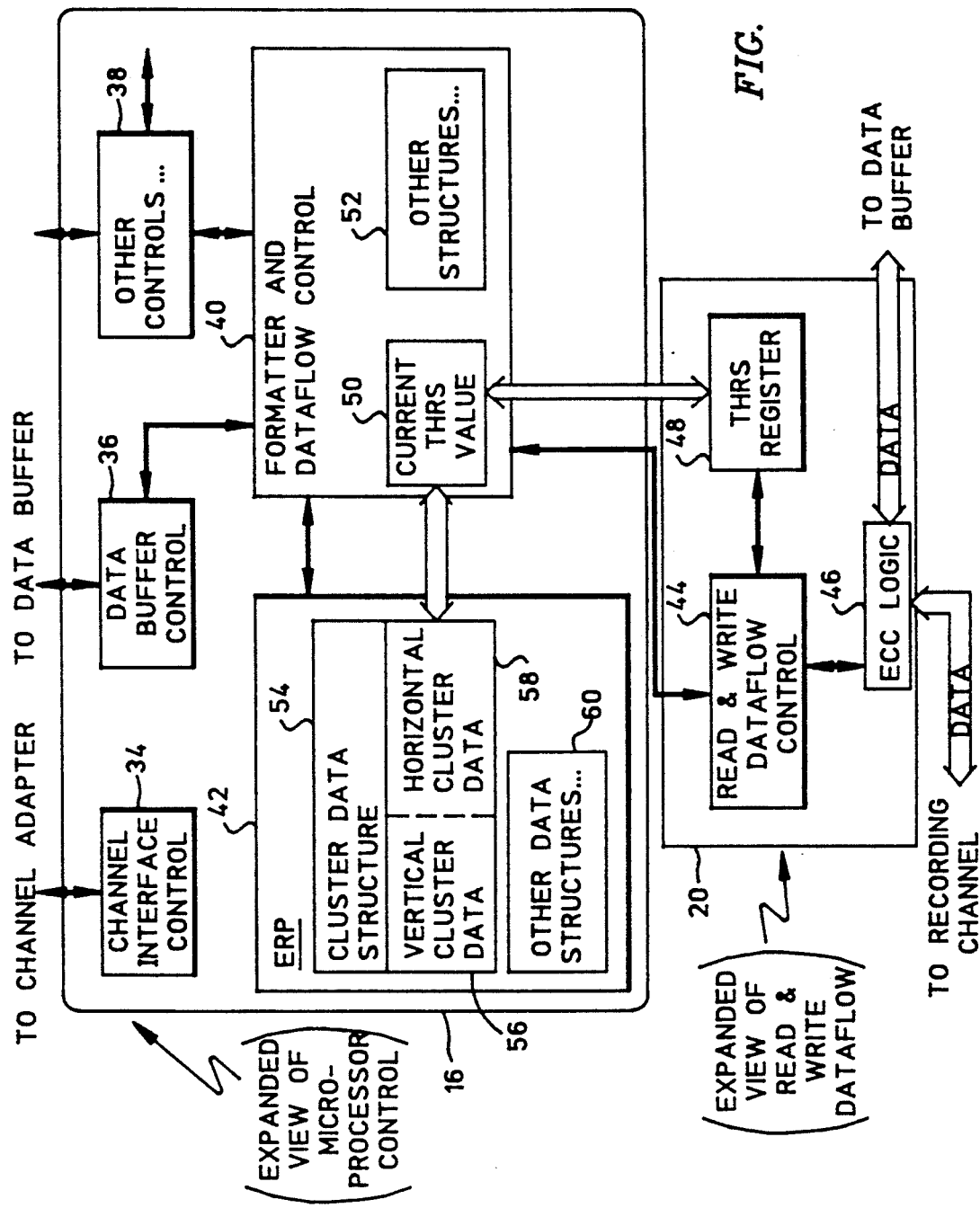
FIG. 2 is a block diagram providing an expanded view of components of the tape drive device of FIG. 1.

Referring now to FIG. 2, components of the microprocessor controller 16 and read/write dataflow circuitry 20 are shown in greater detail. The microprocessor controller 16 includes a channel interface controller 34 to implement the exchange of control information between the microprocessor controller 16 and the channel adaptor 14. The microprocessor controller 16 further includes a data buffer controller 36 to implement the exchange of control information between the microprocessor controller 16 and the data buffer 18. Other controllers, illustrated collectively by reference number 38, are used to implement the exchange of control information between the microprocessor controller 16 and other components of the tape drive control system including the motion controller 22 and other components (not shown), as is known in the art.

Additional components contained within the microprocessor controller 16 include a formatter and dataflow control system 40 and an error recovery system 42, each of which is controlled by appropriate microcode routines of the microprocessor controller 16. The formatter and dataflow control system 40 directs operations of the read/write dataflow circuitry 20, as well as the data buffer 18 via the data buffer controller 36. The error recovery system 42 is programmed to perform error recovery procedures when non-ECC correctable errors occur.

The read/write dataflow circuitry 20 includes read/write dataflow control hardware 44 that oversees read/write dataflow operations. The control hardware 44 communicates control information to ECC logic hardware 46, which performs ECC encoding/decoding of all data transferred between the data buffer 18 and the tape interface system 24.

The tape drive 10 records data on one or more data tracks of the tape medium 28 in a sequence of formatted information blocks. During ECC error correction operations, the ECC logic hardware 46 provides an ECC error correction record for each processed information block to the read/write dataflow control hardware 44. The read/write dataflow control hardware 44 stores this information in a bit register illustrated as THRS register 48 in FIG. 2. The THRS register 48 is a multi-bit register providing a single bit storage location for each active read/write channel (physical track). The bits in the THRS register 48 are set to "1" or "0" depending on whether excessive ECC error correction occurred in the corresponding physical tracks as each information block is processed. The THRS register 48 thus contains current track performance information for all active read/write channels transferring data to or from the tape medium 28. The ECC error correction threshold at which the bits of the THRS register 48 are set is programmable in the microprocessor controller 16.

As each information block on the tape medium 28 is processed, the information contained in the THRS register 48 is transferred to the formatter and dataflow control system 40 where it is placed in a THRS value store 50. As is conventional, the formatter and dataflow controller 40 includes additional structures and components 52, whose functions are not germane to the present disclosure and therefore will not be described.

Where high density multi-track recording is utilized, multiple "data" tracks can be recorded using a smaller subset of "physical" head elements, with each data track being written by one and only one physical head elements (i.e., read/write head channel), but with physical tracks writing many data tracks. This data storage protocol is achieved using multiple tape wraps and tape wrap halfs. A tape wrap consists of a pair of outbound and inbound recording/playback passes (wrap halfs) across the entire allocated length of the tape medium. The outbound recording pass represents a first wrap half while the inbound recording pass represents a second wrap half. Each wrap consists of two wrap halfs. To maximize recording densities, the read/write heads 26 include a first set of heads that are active during the first outbound wrap half and a second set of heads that are active during the second inbound wrap half. There can be multiple wraps recorded on a tape medium. The total number of data tracks recorded on a medium is determined by multiplying the number of physical tracks or channels of the read/write heads times the number of wrap halfs recorded on the tape. For example, a tape drive that records 16 tracks per wrap half over 4 wraps generates 128 data tracks on the tape medium.

Each wrap half is intended to extend across the entire usable portion of the tape medium. In order to catalog the occurrences of ECC error correction on the tape, the present invention contemplates further dividing the tape into a plurality of tachometer regions. Tachometer regions are defined by the maximum tachometer value corresponding to the usable length of the tape divided by a number required to define an appropriate number of tachometer regions, e.g., 100 regions or some other dimension based on media type and other considerations. Using tachometer regions and data tracks, a tape map can be generated as a two dimensional structure with data tracks indicated on the y-axis and tachometer regions indicated on the x-axis. Each x, y location can be filled with an ECC track performance value determined from the THRS register 48. If the THRS register 48 indicates excessive ECC error correction activity for any track in any information block located in a tachometer region, that excessive correction value can be entered in the tape map. This information provides a basis for an error recovery knowledge-base that can be used for analyzing ECC error correction activity for use in subsequent error recovery by the error recovery system 42.

Figure 3:
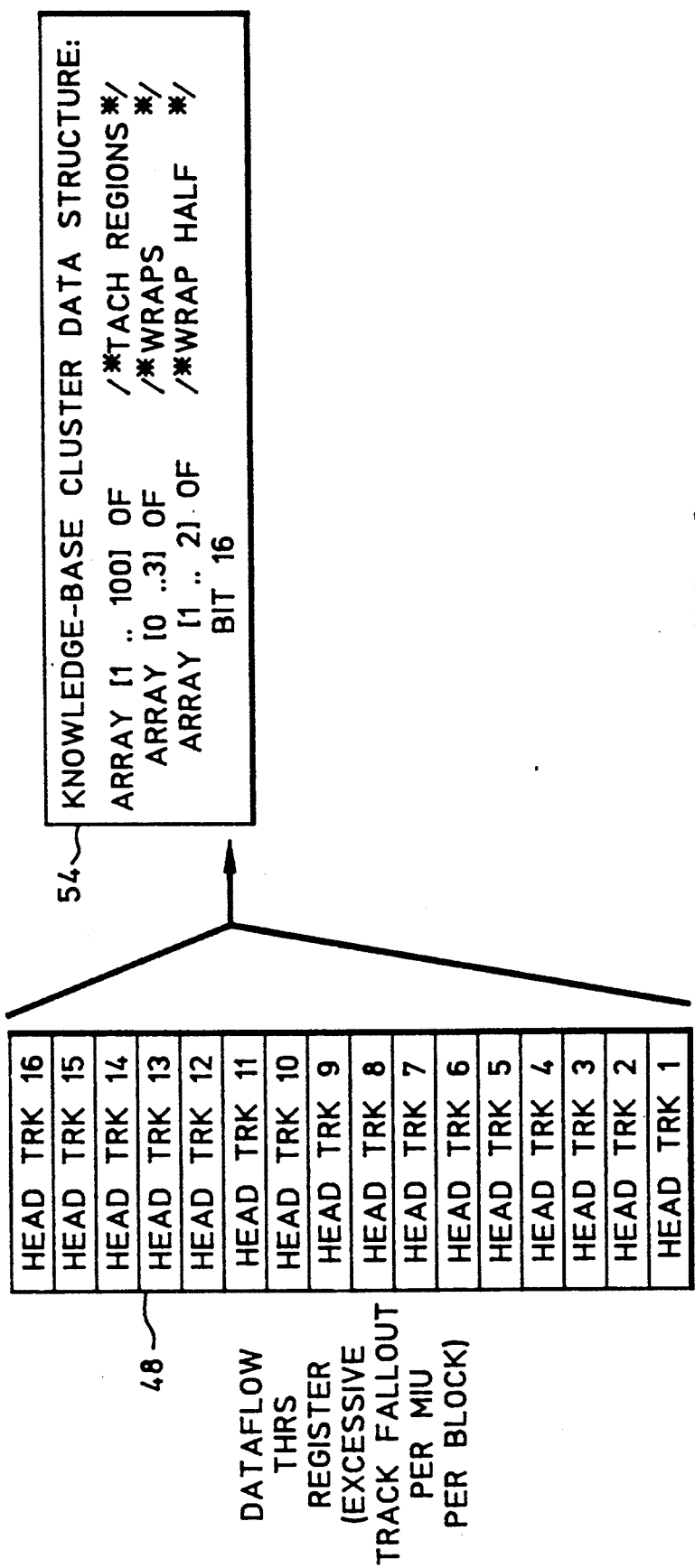
FIG. 3 is a block diagram showing the components of a knowledge-base data structure constructed in accordance with the present invention.

The error recovery knowledge-base is preferably embodied in the error recovery system 42 as an error recovery data structure 54. The data structure 54 defines a hierarchy of storage array locations for identifying tape map locations by tachometer region, tape wrap, tape wrap half, and tape track. This data structure array hierarchy is illustrated (in a sixteen track configuration) in FIG. 3. Although the number of tachometer regions, wraps, wrap halfs and physical tracks is arbitrary, FIG. 3 shows a tape map configuration wherein a tape is divided into 100 tachometer regions. Each tachometer region contains four wraps. Each wrap contains two wrap halfs. Each wrap half contains a sixteen bit track storage array corresponding to the THRS register bits for each physical track. The storage array locations of the data structure 54 can thus be used to uniquely catalog excessive ECC error correction (i.e., track performance) information from the THRS register 48 for each wrap half of each wrap of each tachometer region of the tape.

The data structure 54 is generated during read/write data transfer operations performed on the tape medium 28. As each multi-track information block is processed on the tape, ECC error correction information is provided to the THRS register 48. That information is placed in the data store 50 in the formatter and dataflow control system 40 and sent to the error recovery system 42, together with information identifying the current tachometer region, tape wrap and tape wrap half. Initially, the sixteen bit track storage array locations of the data structure 54 are initialized to "0". Those values are set to "1" if and when a "1" bit from a corresponding location in the THRS register 48 is received. Once a "1" bit value is set in the data structure 54, it is not reset to "0" until subsequent initialization. Thus, as information blocks for the same tachometer region, tape wrap and tape wrap half are processed, the bits of the sixteen bit track storage array are set if corresponding bits are set in the THRS register 48 at any time during block processing, but are never reset to "0" even though the THRS register may contain a "0" for that track in a subsequent information block. The result of this storage array-building sequence is that if excessive ECC error correction occurred in any track in any information block of the tachometer region, the corresponding storage location in the track storage array of the data structure 54 will have its bit set to indicate the excessive ECC correction.

As tape processing proceeds through successive tachometer regions, wraps and wrap halfs, the data structure 54 begins to reveal a tape map pattern of excessive ECC error correction activity. Those patterns include vertical error clusters and horizontal error clusters. Vertical error clusters are indicated when excessive ECC error correction occurs in one or several adjacent tachometer regions across a substantial number of tape wraps and wrap halfs. Horizontal clusters are indicated by excessive ECC error correction activity on particular tracks or wrap halfs spanning several tachometer regions.

Figure 4:
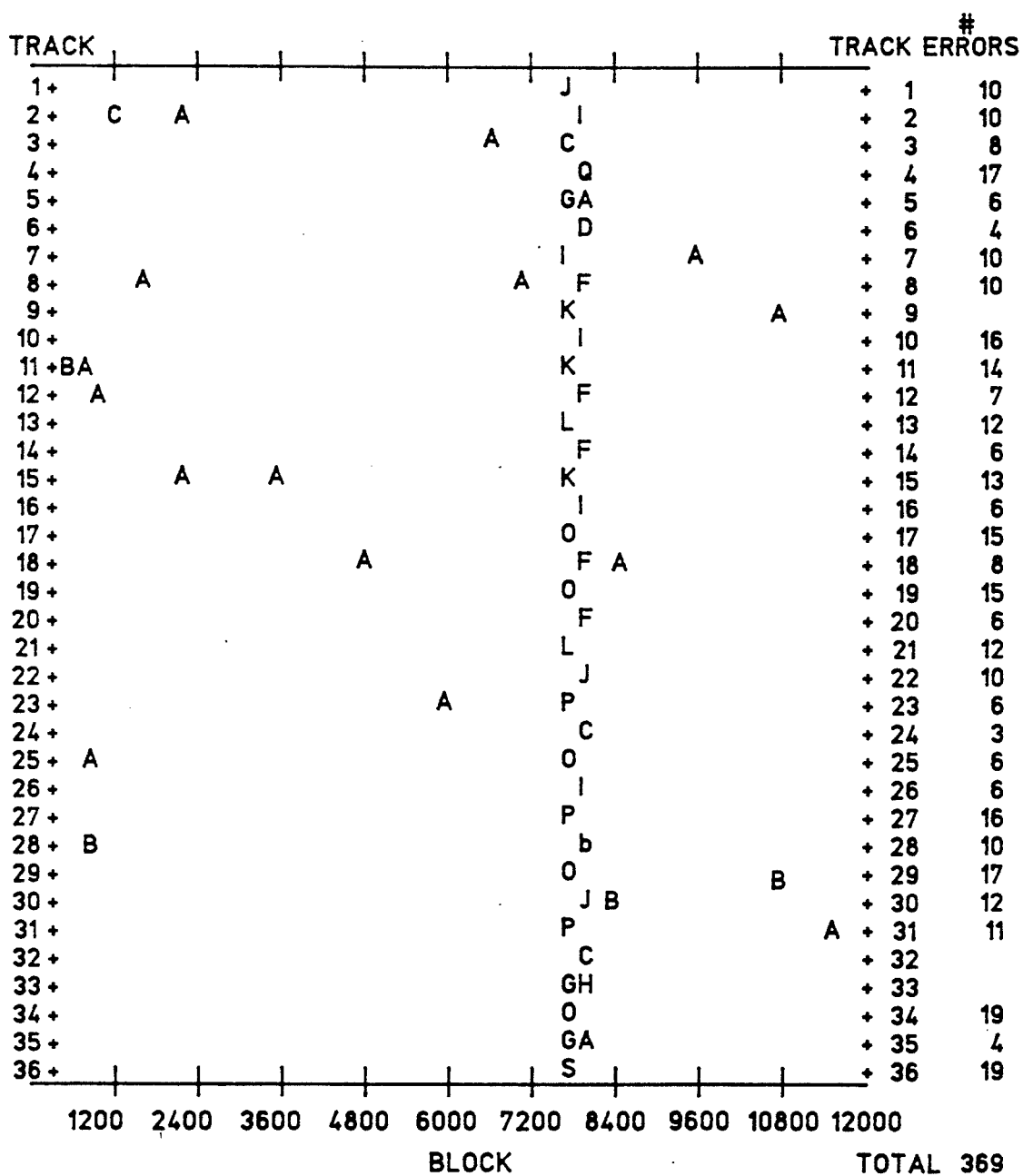
FIG. 4 is a tape map graph showing a vertical error cluster.

FIG. 4 illustrates a graphical tape map representation showing a vertical cluster of ECC error correction activity. The y axis of FIG. 4 illustrates 36 data tracks while the x axis illustrates 100 tachometer regions containing 120 information blocks each. The vertical cluster appears in adjacent tachometer regions 62 and 63, and extends across all of tracks 1-36 and thus all of the wraps and wrap halfs written on the tape.

Figure 5:
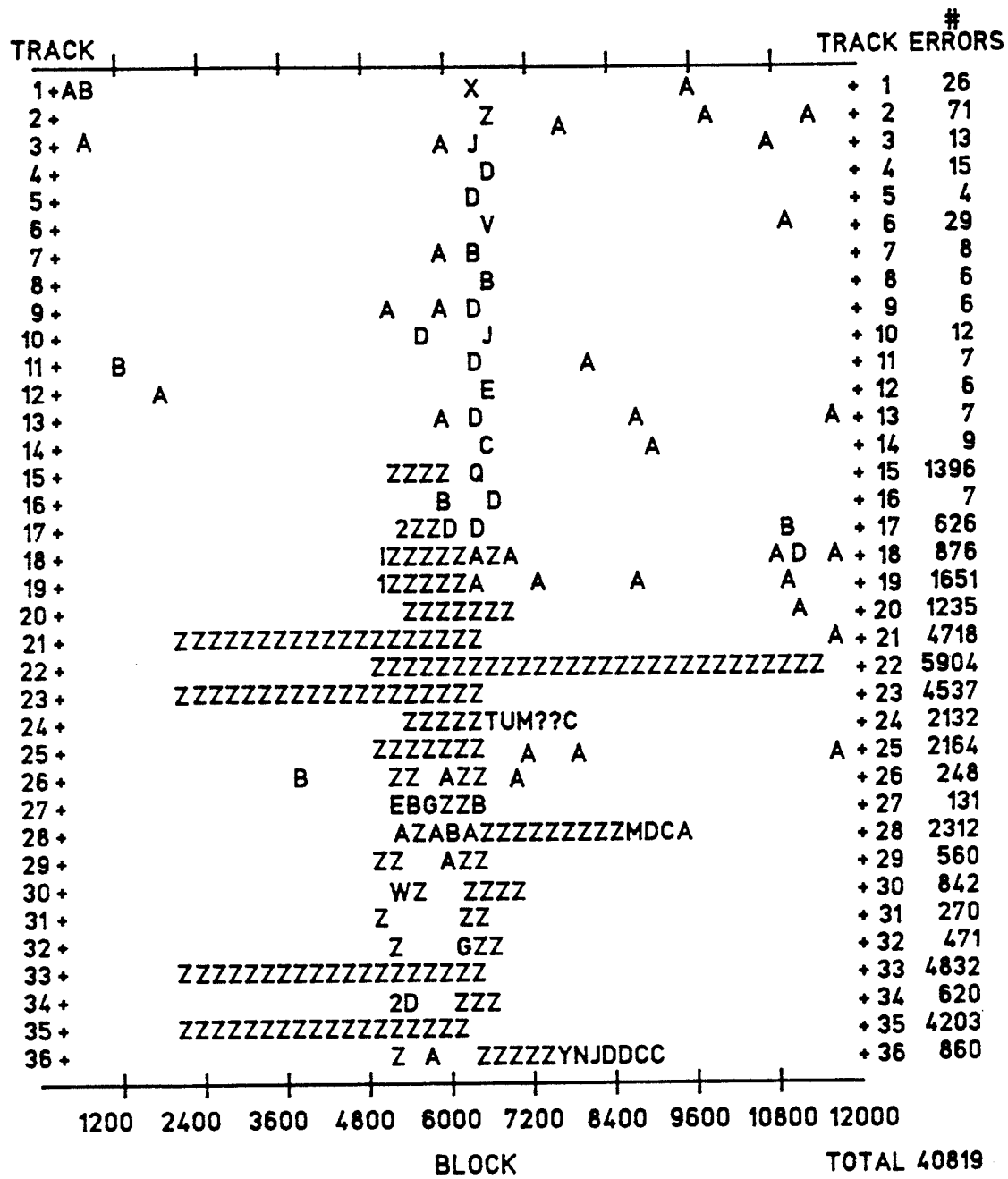
FIG. 5 is a tape map graph showing a horizontal error cluster.

FIG. 5 illustrates a graphical tape map representation showing horizontal clustering errors occurring on a tape. The y axis illustrates data tracks 1 through 36, while the x axis illustrates tachometer regions 1 through 100, containing 120 information blocks each. Horizontal clustering errors are shown on a number of tracks including tracks 21, 22 and 23, as well as tracks 33 and 35.

When an error recovery action is taken, vertical and horizontal clusters can be readily determined by summing the excessive error correction bit values of selected track storage array locations of the data structure 54. Vertical clustering is determined by summing the track storage array bit values for each physical track, wrap half and wrap of a tachometer region. This summation is compared to a programmable vertical clustering threshold. Vertical clustering is indicated if the bit sum exceeds the threshold. Thus, given a tachometer region, a vertical defect cluster is indicated if the following series of summations exceeds a programmable threshold, "VC":

$$\sum_{wrap=0}^{W} \sum_{wraphalf=1}^{2} \sum_{phytrk=1}^{T} Datatryk_{wrapwraphalfphytrk} > VC$$

The vertical defect cluster threshold VC can be any value up to the total number of data tracks recorded on the tape medium. Normally, however, VC would be in a range from one to the total number "T" of physical tracks being simultaneously utilized for each wrap half. In multi-wrap recording (e. g. "W" wraps), it is desirable to set the vertical defect cluster threshold so that vertical defect clusters are identified early in the data transfer process. Once a vertical cluster is identified during error recovery, its existence and tachometer region location(s) are stored in a vertical cluster data store 56 which is also part of the data structure 54 in the error recovery system 42. The vertical cluster data includes a width value indicating the number of adjacent tachometer regions encompassed by the vertical cluster.

Horizontal clustering can be determined in analogous fashion except that the summing of ECC error activity occurs over multiple tachometer regions. Horizontal clustering is determined by summing the track storage array bit values of adjacent tachometer regions for each data track. This summation is compared to a programmable horizontal clustering threshold. The summation set forth below is performed for each physical track actively transferring data to or from the tape medium. The designation "tr" represents the current tachometer region. The wrap, wrap half and physical tracks are held constant for each summation. Horizontal clustering is indicated for a data track if the bit sum for that data track over the specified region exceeds the programmable threshold "HC":

$$\sum_{region=tr-n}^{tr} \text{Phystrack}_{wrapwraphalfphytrk} = HC_{phytrk}$$

Horizontal clusters identified during error recovery are stored, together with their tachometer region locations in a horizontal cluster data store 58 which is also part of the data structure 54 in the error recovery system 42.

The error recovery system 42 includes additional data structures illustrated by reference number 60 in FIG. 2. One of the data structures maintains a small queue containing information about previous non-ECC correctable error recovery performed by the error recovery system 42. This information queue contains tachometer information identifying where on the tape the error recovery action occurred. Based on this information, cyclical horizontal defects can be detected. These are often caused by embossments which tend to repeat at locations of the tape corresponding to the diameter of the supply hub that supports the tape. If the information queue 60 indicates that error recovery is occurring at locations on the tape of similar length and roughly a hub diameter apart, a cyclical horizontal defect is identified.

The data structure 54 thus provides an error recovery knowledge-base representing a tape map of ECC error correction locations on the tape medium. From this data structure, vertical clusters and horizontal clusters can be identified using programmable clustering thresholds. In addition, cyclical horizontal defects can be identified when selected error recovery patterns emerge.

Figure 6:
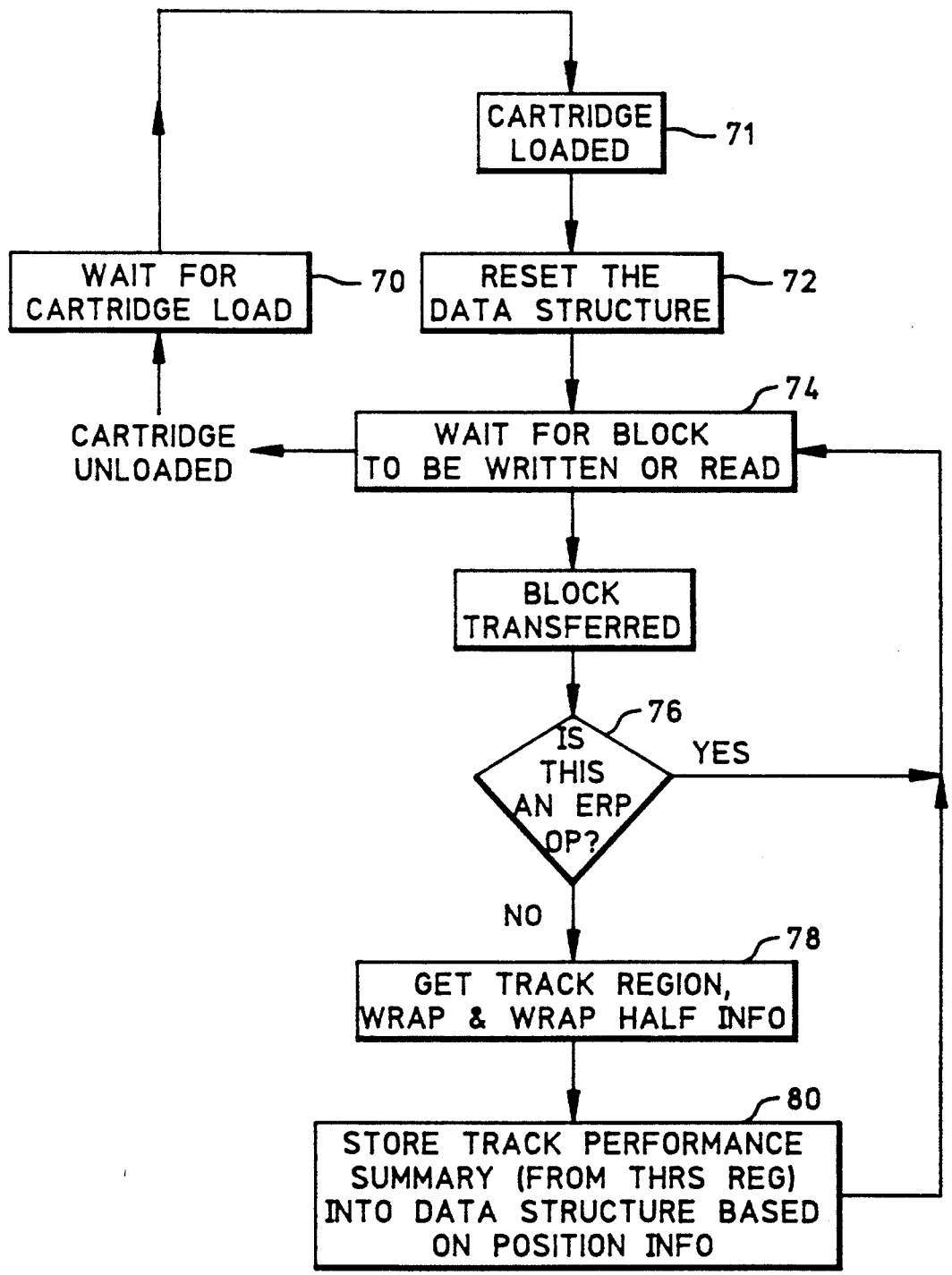
FIG. 6 is a flow diagram showing the construction of the knowledge-base data structure of FIG. 3.

Referring now to FIG. 6, the above-described process for building the data structure 54 is shown diagrammatically as commencing with the loading of a tape cartridge containing the tape medium 28 in step 70. Upon cartridge load in step 71, the data structure 54 is reset in step 72 and the system waits for the information blocks to be written to or read from the tape medium in step 74. When an information block is transferred to or from the tape medium 28, decision is made in step 76 whether an error recovery operation (performed by the error recovery system 42) is underway. If it is, no activity is performed with respect to the data structure 54. Rather, track performance archival in the data structure 54 is suppressed during any error recovery action to avoid introducing duplicate or redundant data. Conversely, error recovery as a functional area will not be active when ECC error correction information comes in for archival in the data structure 54. If it is determined that an error recovery operation is not underway, values representing the current tachometer region, tape wrap and tape wrap half are retrieved from the read/write dataflow control hardware 44 in step 78 and used by the formatter and dataflow controller 40 to store the track performance summary information from the THRS register 48 into an appropriate array location of the data structure 54 in step 80. Process control then returns to step 74 to wait for the next information block to be written or read.

The information contained in the data structure 54 can be used for a variety of purposes. In accordance with the inventive concepts herein, the data structure 54 provides an error recovery knowledge-base for dynamically modifying data transfer and error recovery operations in response to the clustering information that is ascertainable from the data structure. For example, if error recovery is invoked during the processing of read or write data, and the error did not occur within a vertical cluster, nominal error recovery procedures can be used. If, however, the error reported to error recovery does lie within a vertical cluster, then the following alternative actions can be taken:

1. Preliminary actions may be added to nominal error recovery logic such as a cartridge refresh operation or shoeshine operation to remove debris from the tape and/or the read/write heads.
2. Stages of error recovery may be bypassed that do not deal with compensating for the effects of bad medium.

When a vertical cluster has been detected during the processing of write data, a stop condition can be set for the vicinity of the widest or closest vertical cluster. When formatter and dataflow controller microcode detects that the read/write heads are sufficiently near the vertical cluster, it can stop writing and invoke error recovery. Error recovery can then skip over or erase across the suspected region of tape in the interest of preventing errors and/or marginally written blocks.

Horizontal clustering information can be used in similar fashion to modify error recovery by performing appropriate actions to remove debris from the head/media interface. Other error recovery actions would address one or more physical tracks exhibiting persistent horizontal error correction activity.

Figure 7A:
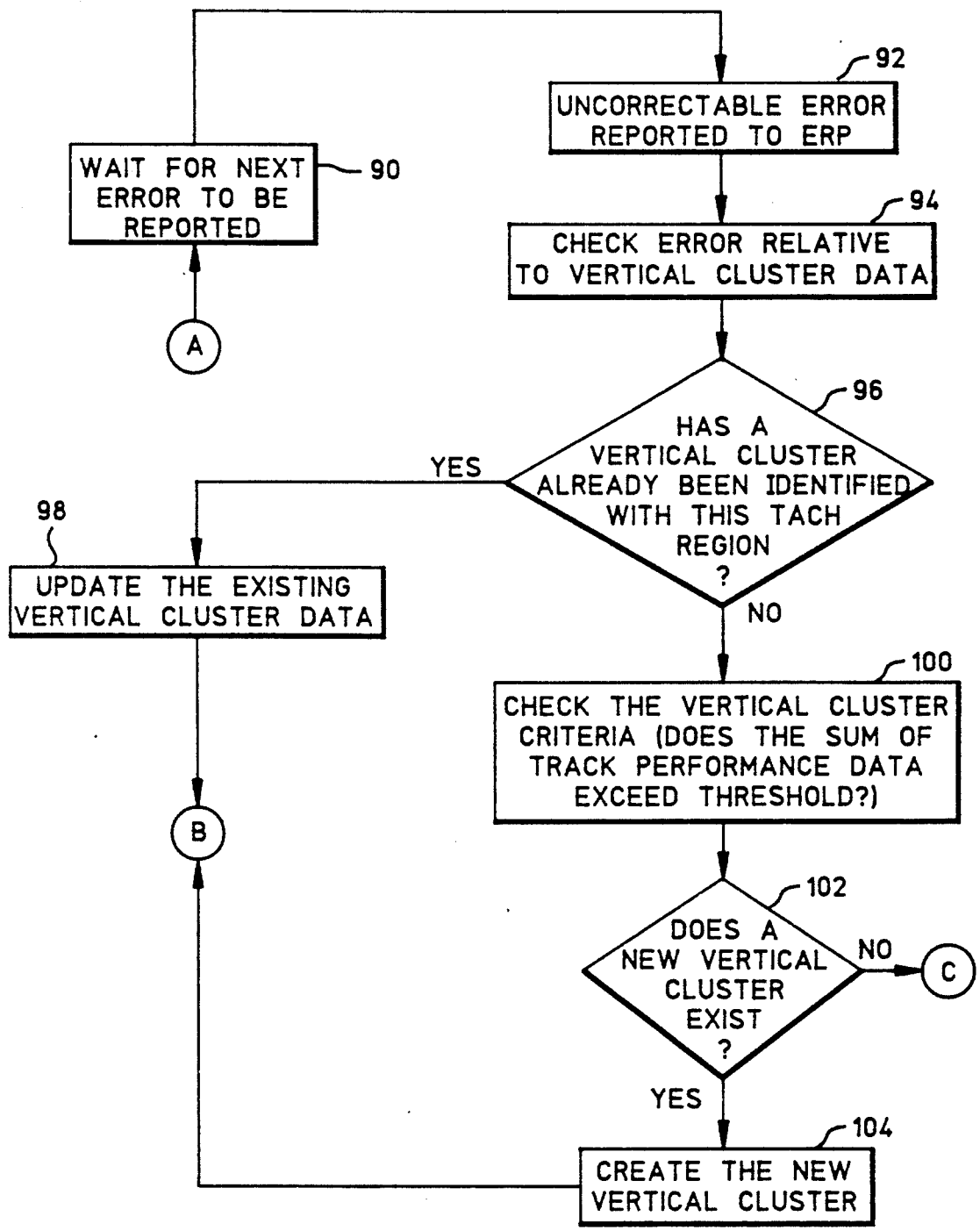
FIG. 7a is a first portion of a flow diagram showing a preferred use of the data structure of FIG. 3 in accordance with the present invention.
Figure 7B:
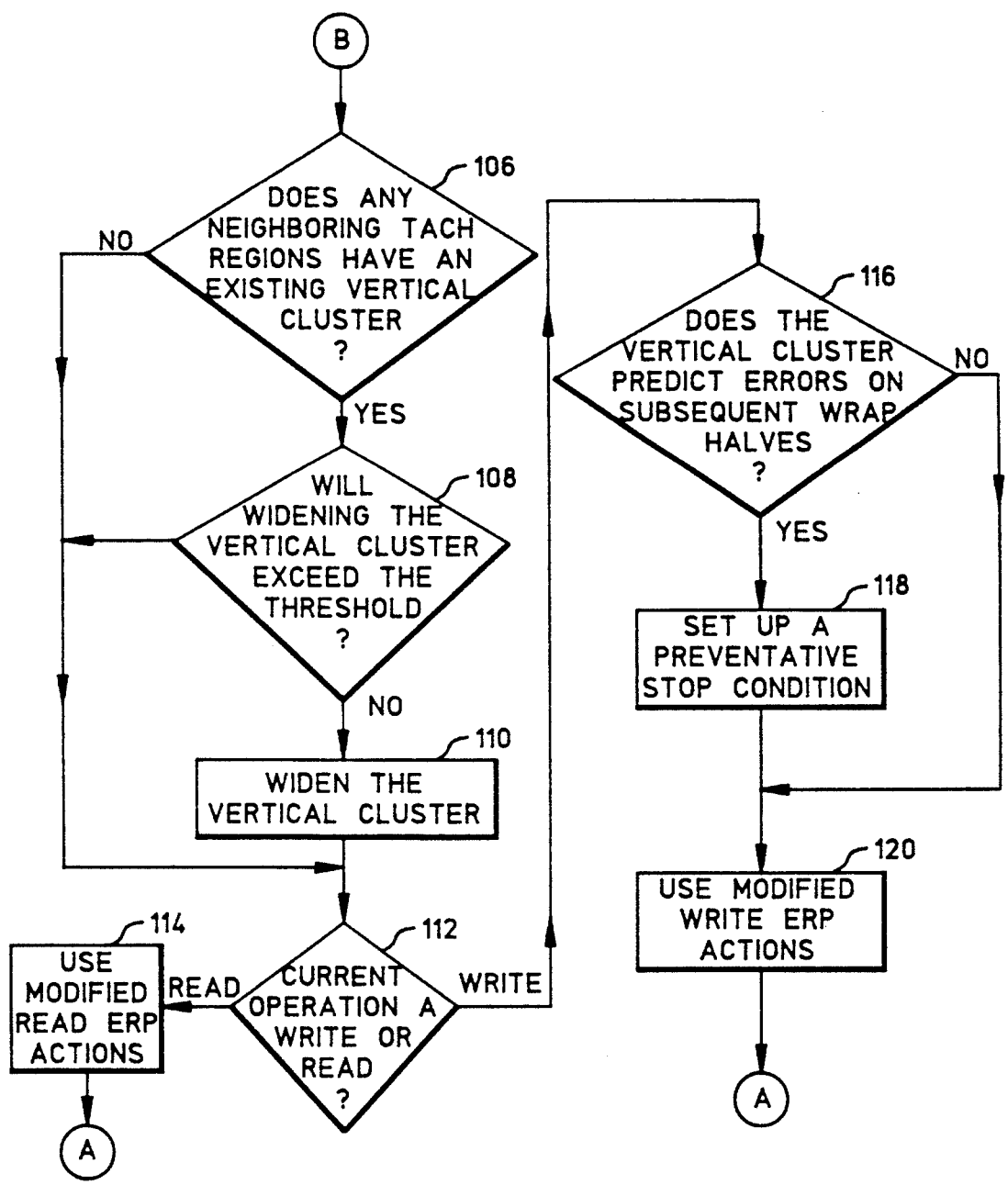
Figure 7C:
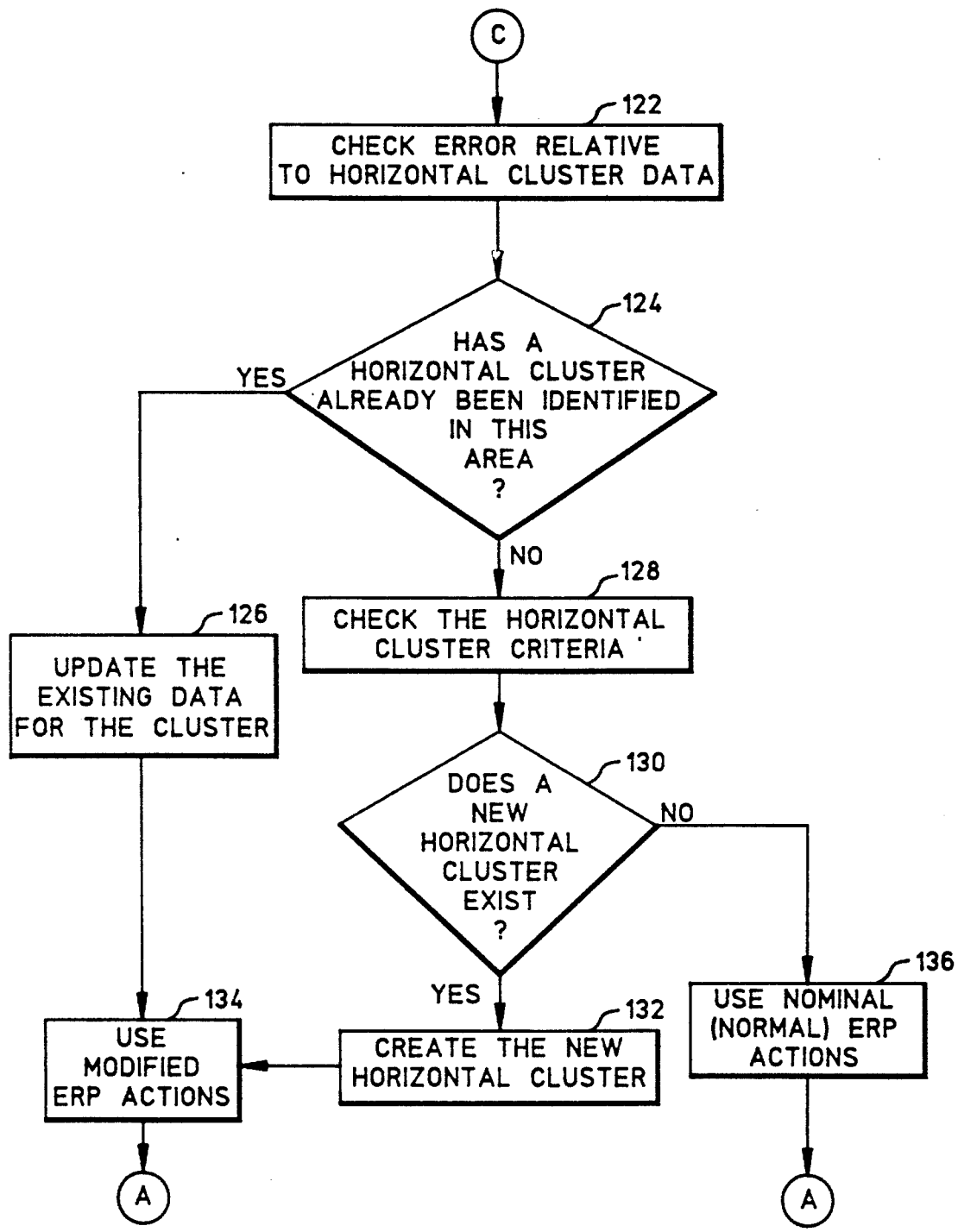

FIGS. 7a-7c illustrate a preferred process for utilizing the track performance information contained in the data structure 54 as an error recovery knowledge-base. From process point "A" (see FIG. 7a), the system waits for a non-ECC correctable error to be reported to the error recovery system 42 in step 90. When such an error is reported in step 92, the error is checked relative to the vertical cluster data, if any, contained in the vertical cluster data store 56 in step 94. If, in step 96, a vertical cluster has already been identified in the tachometer region as a result of previous error recovery, the vertical cluster data store 56 is updated in step 98 to incorporate additional cluster information recorded for that region since the last error recovery action in the region. If no vertical cluster has been previously identified in the tachometer region in which the error arose, the vertical cluster threshold criteria is checked in step 100 to determine whether the threshold has been exceeded. If, in step 102, the vertical cluster threshold has been exceeded, a new vertical cluster is identified in step 104 and stored in the vertical cluster data store 56. Following either of steps 98 or 104, the track performance utilization process moves to point "B" (see FIG. 7b). If a new vertical cluster is found not to exist in step 102, the track performance utilization process moves to point "C" (see FIG. 7c).

Process point "B" is illustrated in FIG. 7b. In step 106, decision is made whether any neighboring tachometer regions adjacent to the identified vertical cluster have existing vertical clusters. If so, decision is made in step 18 whether widening the vertical cluster to include the adjacent cluster(s) will exceed the vertical cluster width threshold. If not, the vertical cluster is widened in step 110 to encompass the neighboring vertical clusters. The reason a vertical cluster width threshold is used is to prevent the widening of vertical clusters to an extent that would indicate a more serious condition wherein a substantial portion of the tape is showing data transfer errors. Such defects must be recognized so that operator notice can be given and appropriate corrective actions taken, such as replacing a tape, cleaning the read/write heads, or other remedies. If the vertical cluster width threshold is exceeded, the vertical cluster is not widened.

The track performance utilization process branches at step 112 depending on whether a read or a write operation is underway. If a read operation is underway, the nominal error recovery actions used by the tape drive are reprogrammed in step 114 using modified read error recovery actions. As described above, such actions may include cartridge refresh or shoeshine operations to remove debris. Alternatively, or in addition, stages of error recovery that do not deal with compensating for the effects of bad media may be bypassed.

If step 112 reveals that a write operation is underway, the vertical cluster information stored in vertical cluster data store 56 is checked in process step 116 to determine whether it predicts errors on subsequent wrap halves in process step 116. This prediction can be made by determining whether the vertical cluster satisfies an additional vertical cluster threshold representing a more well-defined and potentially pervasive vertical cluster.

If subsequent wrap half error correction is predicted, a preventative stop condition is set up in step 118 to allow for skipping over or erasing across the suspected tachometer region(s) in order to avoid subsequent errors and/or marginally written data blocks. In step 120, modified write error recovery actions are performed. These actions may be similar to the modified read error recovery actions and may include cartridge refreshes or shoeshine operations to remove debris. Additionally, stages of error recovery may be bypassed that do not deal with compensating for the effects of bad media. Following either of steps 114 or 120, the track performance utilization process returns to process point "A" in FIG. 7a.

Referring now to FIG. 7c, the track performance utilization process enters process point "C" upon determination in step 102 that a vertical cluster does not yet exist in the tachometer region wherein error recovery occurred. From point "C", the process checks the error relative to any horizontal cluster data contained in the horizontal data cluster store 58 in step 122. Decision is made in step 124 whether a horizontal cluster has already been identified in the tachometer region in which the error arose. If so, the horizontal cluster is recalculated in process step 126 to incorporate any additional horizontal cluster information recorded for that region since the last error recovery action in the region. The updated horizontal cluster data is stored in the horizontal cluster data store 58. If a cluster horizontal has not already been identified for the current region, the horizontal cluster criteria is checked in step 128 to determine whether the horizontal cluster threshold has been exceeded. If, in step 130, a new horizontal cluster is warranted, it is created in step 132 and stored in the horizontal cluster data store 58. Following either of steps 126 or 132, the track performance utilization process performs modified error recovery actions in step 134 based on the existence of a horizontal cluster in the tachometer region in which the error arose. If a horizontal cluster is not indicated in step 130, nominal error recovery actions are performed in step 136. Following either of process steps 134 or 136, the track performed utilization process returns to process point "A" in FIG. 7a.

Accordingly, a novel method for performing knowledge-based error recovery has been described. While various embodiments have been disclosed, it should be apparent that many variations and alternative embodiments would be apparent to those skilled in the art in view of the teachings herein. For example, rather than assigning a single bit value to each track storage array location of the data structure to indicate an ECC error condition, weighted values could be used to provide additional track information. It will also be appreciated that the error recovery routines performed in response to error clustering are entirely programmable and could include any procedure deemed appropriate for the conditions at hand. It is understood, therefore, that the invention is not to be in any way limited except in accordance with the spirit of the appended claims and their equivalents.

We claim:

1. In a tape drive data storage apparatus including a control system for reading and writing host data on a streaming tape medium, an error correction coding (ECC) system for detecting and correcting data transfer errors, and an error recovery system for performing non-ECC correctable error recovery, a method for dynamically performing knowledge-based error recovery comprising the steps of:

performing read and/or write data transfer operations on a tape medium loaded in the tape drive;

generating during said data transfer operations an error recovery knowledge base representing a tape map of ECC error correction locations on said tape medium;

determining from said tape map upon the initiation of an error recovery event whether one or more error clustering thresholds have been reached in one or more selected regions of said tape medium; and if so modifying the error recovery performed by the error recovery system in said selected tape medium regions.

2. The method of claim 1 wherein said clustering thresholds include a vertical clustering threshold.

3. The method of claim 1 wherein said clustering thresholds include a horizontal clustering threshold.

4. The method of claim 1 wherein said clustering thresholds include a cyclical defect threshold.

5. The method of claim 4 wherein said cyclical defect threshold represents one or more ECC error correction locations occurring at selected distances from each other along said tape medium corresponding to the diameter of a hub around which said tape medium is wound.

6. The method of claim 1 wherein said data transfer operations are performed concurrently on multiple tracks of said tape medium.

7. The method of claim 1 wherein said tape map defines a hierarchy of tape tachometer regions, tape wraps, tape wrap halfs and tape tracks.

8. The method of claim 7 wherein said clustering thresholds include a vertical clustering threshold representing said ECC error correction locations occurring in a selected number of said tape tracks persistently in one or more of said tape tachometer regions.

9. The method of claim 7 wherein said vertical clustering threshold represents said ECC error correction locations occurring in a selected number of said tape tracks in at least one bit less than a selected plural number of said tape tachometer regions.

10. The method of claim 9 wherein said clustering thresholds include a horizontal clustering threshold representing said ECC error locations occurring in at least one of said tape tracks in a selected number of said tape tachometer regions.

11. A system for dynamically performing knowledge-based error recovery in a tape drive data storage device having one or more read/write heads, comprising:

means for generating a data structure comprising plural storage array locations corresponding to locations on said tape medium;

means for sequentially storing in said data structure storage array locations, a continuous series of values representing error information determined from data transfer operations performed by the tape drive data storage device;

means for determining whether an error recovery event has occurred; and means responsive to said error recovery determining means for performing one or more selected error recovery actions upon said values stored in said data structure exceeding one or more threshold values.

12. The system of claim 11 wherein said threshold values include a vertical clustering threshold value.

13. The system of claim 11 wherein said clustering threshold values include a horizontal clustering threshold value.

14. The system of claim 11 wherein said clustering threshold values include a cyclical defect threshold value.

15. The system of claim 14 wherein said cyclical defect threshold value represents one or more data transfer errors occurring at selected distances from each other along said tape medium corresponding to the diameter of a hub around which said tape medium is wound.

16. The system of claim 11 wherein said data transfer operations are performed concurrently on multiple tracks of said tape medium.

17. The system of claim 11 wherein said data structure storage array locations correspond to parallel data tracks on said tape medium arranged in a hierarchy of tape tachometer regions, tape wraps and tape wrap halfs.

18. The system of claim 17 wherein said threshold values include a vertical clustering threshold value representing data transfer errors occurring in a selected number of said tape tracks persistently in one or more of said tape tachometer regions.

19. The system of claim 17 wherein said threshold values include a horizontal clustering threshold value representing data transfer errors occurring in one or more of said tape tracks in a selected number of said tape tachometer regions.

20. In a tape drive data storage apparatus including a control system for reading and writing host data on a streaming tape medium, an error correction coding (ECC) system for detecting and correcting data transfer errors, and an error recovery system for performing non-ECC correctable error recovery, a method for dynamically performing knowledge-based error recovery comprising the steps of:

performing read and/or write data transfer operations on multiple tracks of a tape medium loaded in the tape drive;

generating during said data transfer operations an error recovery knowledge base representing a tape map of ECC error correction locations on said tape medium, said tape map defining a hierarchy of tape tachometer regions, tape wraps, tape wrap halfs and tape tracks;

determining from said tape map upon initiation of an error recovery event whether one or more error clustering thresholds have been reached in one or more selected regions of the tape; and if so modifying the error recovery performed by the error recovery system in said selected tape regions;

said clustering thresholds including a vertical clustering threshold representing said ECC error correction locations occurring in a selected number of said tape tracks in one or more of said tape tachometer regions;

said clustering thresholds further including a horizontal clustering threshold representing said ECC error locations occurring in one or more said tape tracks in a selected number of said tape tachometer regions; and said cyclical defect threshold representing one or more ECC error correction locations occurring at selected distances from each other along said tape medium corresponding to the diameter of a hub around which said tape medium is wound.

* * * * *

UNITED STATES PATENT AND TRADEMARK OFFICE
CERTIFICATE OF CORRECTION

PATENT NO. : 5,331,476
DATED : July 19, 1994
INVENTOR(S) : Fry et al.

It is certified that error appears in the above-indentified patent and that said Letters Patent is hereby corrected as shown below:

Please amend Claim 9 as follows:

9. The method of Claim [7] 8 wherein said vertical clustering threshold represents said ECC error correction locations occurring in a selected number of said tape tracks in at least one bit less than a selected plural number of said tape tachometer regions.

Signed and Sealed this

Eleventh Day of October, 1994

Attest:

BRUCE LEHMAN

Attesting Officer     Commissioner of Patents and Trademarks